Figure 1:
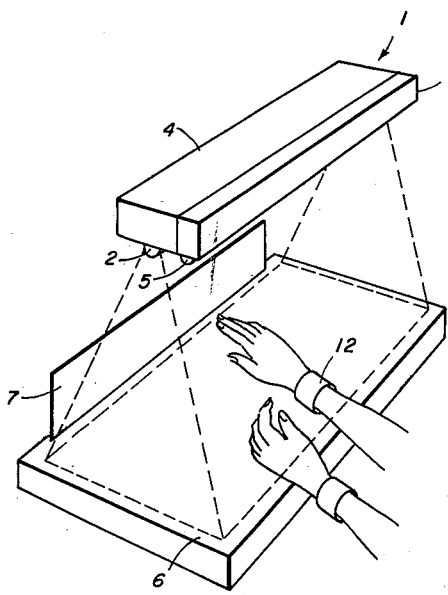

Oct. 29, 1963    N. A. MARSHALL ETAL    3,109,094
SAFETY DEVICE FOR INDUSTRIAL MACHINES COMPRISING
FLUORESCENCE DETECTION APPARATUS
Filed July 29, 1960    2 Sheets-Sheet 1

INVENTORS
NEIL A. MARSHALL
GEORGE A. WORK
BY

*Paul A. Gulliksen*
ATTORNEYS

INVENTORS
NEIL A. MARSHALL
GEORGE A. WORK
BY

ATTORNEYS

United States Patent Office 3,109,094
Patented Oct. 29, 1963

3,109,094
SAFETY DEVICE FOR INDUSTRIAL MACHINES COMPRISING FLUORESCENCE DETECTION APPARATUS
Neil A. Marshall, 2351 Rocking Horse Road, Rolling Hills, San Pedro, Calif., and George A. Work, 520 E. Adams, Apt. 17, Long Beach, Calif.
Filed July 29, 1960, Ser. No. 46,316
2 Claims. (Cl. 250—71)
(Granted under Title 35, U.S. Code (1952), sec. 266)

The invention described herein may be manufactured and used by or for the Government of the United States of America for governmental purposes without the payment of any royalties thereon or therefor.

The present invention relates to photodetection of fluorescent emissions and, more particularly, to the selective detection of a particular fluorescence from a background of light radiations.

Photo tubes are well known in many uses or applications such as the so-called "electric eye" operation of doors and other objects, as well as their employment in industrial safety devices which, as will become apparent, constitutes an important facet of the present invention. As such a safety device, the beam of the electric eye is so arranged as to view a danger or blade area of an industrial machine so that, when interrupted by the operator's hands, the operating circuit of the machine is broken and the machine stops. Although this concept is entirely feasible, it presents a number of difficulties such as the required geometry as well as the fact that the beam may be interrupted accidentally by the work itself or by any object other than the operator's hands.

It is, therefore, one of the objects of the present invention to provide an industrial safety device similar to the "electric eye" but so arranged as to permit a machine shut-down only when the operator, as opposed to any other physical object, enters the danger zone. In this regard, a feature of the invention is the use of a fluorescence-producing light source to flood the danger zone, as well as the idea of requiring the operator to wear fluorescing gauntlets or other appropriate bands. Photo tubes, or their equivalent, then are employed to sense the emissions from the gauntlets and to shut down the machine when so sensed.

An equally significant object is to provide an apparatus capable of selecting particular fluorescence-excited emissions from a background of radiations which may include fluorescent or other light having either the spectral or electrical properties of these particular ultra-violet emissions.

Obviously the accomplishment of this last-mentioned objective is an important consideration in the previously-discussed industrial machine applications since otherwise the machines might shut down in response to other radiations in its immediate area. However, as will be recognized, the ability of the arrangement to selectively "read" only the particular fluorescence permits a number of other advantageous utilizations. For example, the arrangement enables a most realistic simulation of radioactive contamination detection, the significance of which as a training aid will be readily apparent to those familiar with the hazards and problems involved in contamination studies.

A further related object is the provision of a light source which produces a fluorescence that can be readily and clearly distinguished by the detector.

These and other important objects will become more apparent in the following description and claims.

In a general manner, the ability to selectively detect the fluorescence is achieved first by driving the source, preferably an ultra-violet source, at a predetermined pulsed or modulated frequency substantially different from the frequency of environmental radiations, and next by employing a frequency-sensitive detector circuit in conjunction with a spectrally-selective filter. The net result is that radiations having wavelengths or frequencies different from the UV-excited radiations are rejected.

Figure 2:
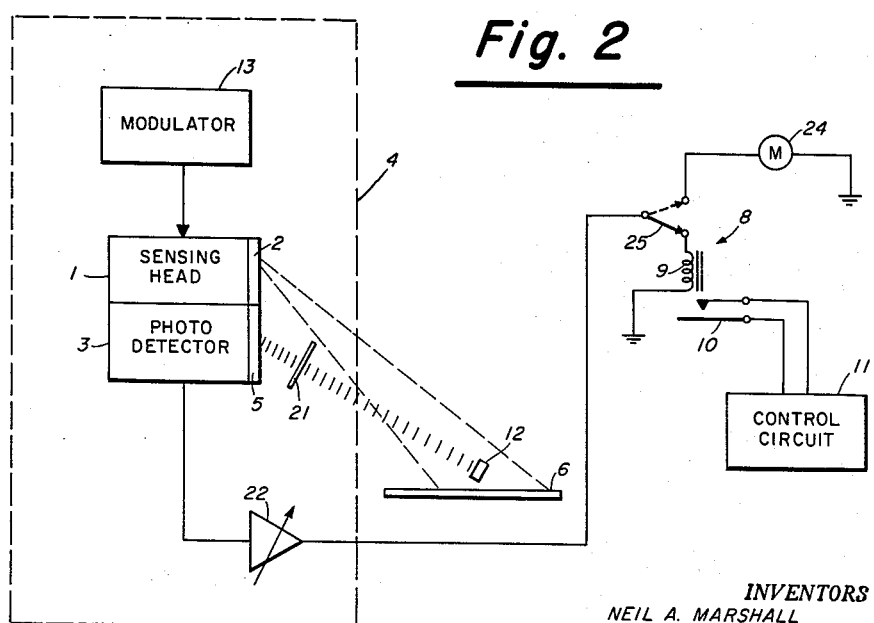
Figure 3:
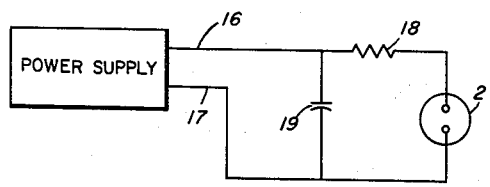
Figure 4:
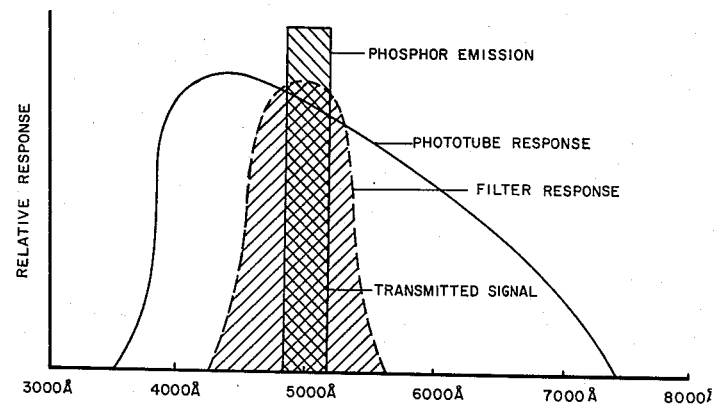
Figure 5:
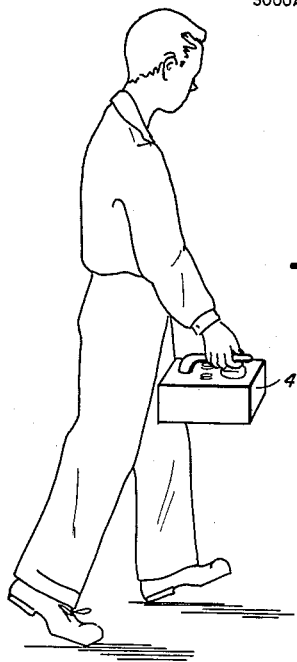

The invention is illustrated in the accompanying drawings of which:

FIG. 1 schematically shows a punch press and the apparatus for exciting and sensing fluorescence in the punch press danger zone area;

FIG. 2 is an electrical diagram showing in block form the components used in projecting the ultra-violet onto a surface, as well as the components required for selectively sensing the desired fluorescence emanating from the surface;

FIG. 3 a special light driver circuit capable of producing high peak intensity light pulses;

FIG. 4 is a plot showing the relative response of various components of the detector; and FIG. 5 illustrates a special use in which the requisite circuitry is embodied in a radiac for simulated radioactive contamination detection.

In describing the invention, the industrial safety device application first will be considered primarily because this application more clearly demonstrates the principles upon which the invention is based.

Referring to FIG. 1 the arrangement there shown illustrates a so-called sensing head 1 containing an ultra-violet light source in the form of a tube 2 and a detector generally indicated by the numeral 3. The sensing head, which is in the form of a box 4, is disposed at any convenient location over the industrial machine so as to direct its light onto a bed or platen 6 of the machine which, in an exemplary manner, is depicted as a punch press having a blade 7 or some other similar reciprocable member. Most suitably, the light source is of the type commonly known as "black light" which is a long wavelength ultra-violet of about 3300 A.–3600 A. Such a light is noninjurious and consequently preferable to the use of radiations of shorter wavelength spectral regions. Also, the source is provided with an ultra-violet transmissive filter capable of removing visible light from the mercury spectrum if, as is contemplated, a mercury arc source is employed. Obviously, other solid electrode arc light sources could be employed. Filters of this type are a common practice and usually are provided as an inherent part of the light source.

As now should be apparent, the purpose of this ultra-violet source is to flood the danger zone of the press so that fluorescing objects entering this area can be sensed by detector 3 which, most suitably, is a photo tube 5 capable of producing a relay-actuating current for operating a press de-energizing relay 8. Obviously the press can be de-energized in many manners which are not of any special interest in the present invention. As shown, the relay includes a solenoid 9 energized by the phototube output current to operate a switch 10 in the machine control circuit 11. Clutch-operating mechanisms and other arrangements could be substituted if desired.

To produce the fluorescence necessary to initiate the phototube output current, it, of course, is necessary to have a fluorescing object or material. As shown in FIG. 1, the fluorescing object is provided by special gauntlets 12 worn by the operator, and, as would be surmised, these gauntlets may be formed of any of the fluorescing phosphors without any particular regard for shape or size. When bombarded by the ultra-violet, the gauntlets yield the secondary radiation emission to be sensed by detector tube 5.

FIG. 2 better illustrates the manner in which the detector functions to selectively respond only to the ultraviolet excited fluorescence. Generally, the selective response is due in part to the fact that light source 2 is pulsed or modulated at a predetermined frequency and, for this purpose, a suitable modulator 13 is provided. Such a modulator may be a thyratron pulser, power multivibrator, blocking oscillator, or a relaxation oscillator of the type shown in FIG. 3.

The FIG. 3 relaxation oscillator is employed primarily to produce high intensity pulses of a fast pulse rise time which may be in the order of the rise time of sine wave frequencies up to 100,000 c.p.s. The desirability of such pulses will be explained later. As to the circuit itself, it may be seen that a voltage is impressed across lines 16 and 17 which are coupled to the solid electrodes of arc discharge light 2, and, in the preferred form of the apparatus, the power supply may be provided by suitable type D flashlight cells or by coupling to a 110 volt line if this feature should be desired. In the usual manner, a resistance 18 is included in line 16 while a condenser 19 parallels the power supply circuit. By varying resistance 18, capacitance 19, as well as the power supply itself, ultra-violet pulses covering a wide range of intensities and frequencies may be obtained. The capacitor is charged through the resistance and, when the voltage across the capacitor has reached the firing potential of tube 2, the capacitor discharges through the tube at a rate that is dependent on the arc resistance and the internal resistance of the capacitor, its capacity and the inductance of the lead wires. With such an arrangement, peak currents in the order of hundreds of amperes can be achieved. Preferably, a frequency within the range of 1000 p.p.s. to 10,000 p.p.s. is employed. Obviously, other modulators such as those already mentioned are capable of providing the desired frequency, although the high intensity pulses obtainable with the FIG. 3 circuit are advantageous in the subsequent light-detection stages.

The pulsed light from tube 2 floods machine bed 6 so that, when fluorescing gauntlets 12 enter the flooded area, fluorescence is emitted. It is this fluorescence which is to be detected and, as will be appreciated, it is highly desirable to assure that only this particular fluorescence, as opposed to other radiations to which photo detector 3 may be exposed, operates relay 8. For example, referring to FIG. 4, it will be noted that the response of photo tube 5 may be within a rather wide spectral region extending from around 7500 A. to 3200 A. Consequently, visible light from nearby incandescent or fluorescent fixtures, as well as the primary radiations from the ultra-violet source itself, could well trigger the relay channel.

In the present invention, this difficulty is eliminated by requiring the triggering to be in response only to radiations having the proper spectral and modulation characteristics. To accomplish this result, a special color filter 21 is employed and, of equal importance a frequency-discriminating means such as a tuned amplifier 22 is employed in conjunction with photo tube 5. Filter 21 is of a type which transmits fluorescent wavelengths only and, for obvious reasons, it should be a contrast filter with a rather abrupt change, over a short wavelength region, from complete absorption to high transmission. In practice, a green filter has proven most satisfactory.

Tuned amplifier 22, as stated, is transmissive only of those frequencies having the desired or predetermined modulation characteristics for triggering the channel. Consequently, the amplifier is tuned to the frequency of modulator 13, it being apparent that fluorescence excited by the modulated ultra-violet source will have a frequency conforming to the degree of modulation.

The net result is that the green filter tends to reject all radiations not having proper spectral characteristics, while amplifier 22 rejects all radiations not having proper modulation characteristics. Thus, visible light from surrounding fixtures may have the required spectral properties to pass filter 21, but, being at a frequency of 110 c.p.s., any photo tube response to these frequencies will not be capable of passing tuned amplifier 22. Also, the primary radiations from the ultra-violet source do possess the required modulation to pass tuned amplifier 22, but these radiations are eliminated prior to the frequency-discriminating stage by means of filter 21.

The relaxation oscillator of FIG. 3 can be employed to improve the selectivity because of its ability to produce high intensity pulses. This type of excitation circuit greatly improves the electrical to luminous conversion efficiency and saves input power. As an example, relay 8 can be designed with threshold characteristics so as to be operable only in response to signals above a threshold amplitude and this threshold amplitude, in turn, can be placed above that normally obtained from surrounding fluorescent or incandescent fixtures so that the only signal capable of triggering the relay will be one produced by the high intensity pulses. Consequently, the selectivity of the detection system can be made to depend upon the establishment of three requisites, viz, the existence of the proper spectral characteristics, modulation characteristics and threshold amplitude.

FIG. 5 simply is illustrative of a special use of the arrangement already described with reference to FIG. 2. As has been noted, this special use is the provision of a radiac for simulating radioactive contamination detection. The differences between this radiac and the previously described industrial safety application lie almost wholly in the manner in which the instrumentation is used. However, as may be noted in FIG. 2, the radiac employs a voltmeter or other similar indicator 24 in place of relay 8 of the industrial application. This meter may assume any desired form, although it is considered desirable to provide a scale that is compressed at its top end so as to preserve a similarity to actual field radiacs. Also, it is possible to employ a scale-changing meter particularly for use in situations where different fluorescent materials are to be located.

The external appearance of the radiac, of course, is substantially different from the industrial application particularly because again it is desired to maintain as much similarity as possible to field radiacs. However, the radiac application is similar to the extent that all of the components are housed in a single sensing head box 4. In other words, ultra-violet source 1, modulator 13, photo tube 5, filter 21 and tuned amplifier 22 all are contained in box 4. It may be noted that FIG. 2 is schematic to the degree that it shows a switch arm 25 capable of coupling either a meter 24 or relay 8. Thus, the FIG. 2 circuitry, with switch arm 25 in its dotted line position, is the circuitry employed in the radiac. In this regard, switch arm 25 of FIG. 2 also is indicative of the fact that the circuitry can be employed for a variety of purposes.

In using the simulated radiac, it first is necessary to distribute fluorescent materials about a particular training area, following which, the operator carries the instrument around the area holding it in such a manner as to direct the ultra-violet radiations onto the surface of interest. If qualitative as well as quantitative investigations are desired, this may be achieved by employing non-spectrally overlapping filters, and providing means to select a particular filter to determine, for example, which of two simulated radiations have been distributed in the area. Such a simulated radioactive contamination detection is most realistic and therefore provides a valuable training aid. In addition, by use of the instrument, it is possible to demonstrate in a startling manner direct contamination of personnel through accident or carelessness.

Summarizing, the arrangement of components shown in FIG. 2 provides a thoroughly reliable and sensitive manner of detecting fluorescence excited by the ultra-violet source. Obviously, many uses of this instrumentation will occur to those familiar with photoelectric detection problems or, more generally, with the detection and measuring of fluorescent radiation. A particular advantage is that the components all can be housed in a compact arrangement and in a single container, as well as the fact that the requisite geometry permits ready adaptation in many forms or under varying environmental demands.

Obviously many modifications and variations of the present invention are possible in the light of the above teachings. It is therefore to be understood that within the scope of the appended claims the invention may be practiced otherwise than as specifically described.

What is claimed is:

1. Apparatus for controlling the operation of industrial machines of a type having a work bed area over which operator's hands pass during machine operation, said apparatus comprising:
   a sensor head spaced from said work bed,
   a fluorescence-producing radiation source carried by said head and directed toward said work bed for bathing said bed area with said radiation,
   means for modulating said source for producing high intensity pulses of predetermined frequency,
   gauntlet means formed with a fluorescing material and adapted to be worn by machine operators whereupon passage of operators' clothed hands over said radiation-bathed work area produces a fluorescency,
   means for controlling said machine in response to said gauntlet-produced fluorescence,
   a photo-detector carried by said sensor head,
   a fluorescence isolating and transmissive filter for exposing said detector only to the spectral region of said gauntlet-produced fluorescence, and
   means electrically coupled between said detector output and said control means for selectively transmitting to said control means only the detector output produced in response to the fluorescence resulting from said modulated radiation source,
   said selective means including:
      a frequency-discriminating means transmissively responsive only to said modulated predetermined frequency, and
      an amplitude-responsive means having a thresholding response fixed by said modulated pulse intensity.

2. The apparatus of claim 1 wherein said radiation source is a long wave ultra-violet radiation within the spectral region of 3300 A.–3600 A.

References Cited in the file of this patent

UNITED STATES PATENTS

| | | |
|---|---|---|
| 1,458,165 | Coblentz | June 12, 1923 |
| 2,331,023 | Gayring | Oct. 5, 1943 |
| 2,730,625 | Shurcliff | Jan. 10, 1956 |
| 2,742,631 | Rajchman et al. | Apr. 17, 1956 |
| 2,888,570 | Toulmin | May 26, 1959 |
| 2,913,581 | Simonton et al. | Nov. 17, 1959 |
| 2,935,613 | Tirico | May 3, 1960 |
| 2,951,164 | Timms | Aug. 30, 1960 |
| 2,987,620 | Lewis et al. | June 6, 1961 |

FOREIGN PATENTS

| | | |
|---|---|---|
| 686,642 | Great Britain | Jan. 28, 1953 |